United States Patent
Hueffer et al.

(10) Patent No.: US 11,390,713 B2
(45) Date of Patent: Jul. 19, 2022

(54) PROCESS FOR MAKING AN ALKOXYLATED POLYALKYLENIMINE

(71) Applicant: BASF SE, Ludwigshafen am Rhein (DE)

(72) Inventors: Stephan Hueffer, Ludwigshafen (DE); Thomas Wesley Holcombe, Ludwigshafen (DE); Sebastian Mirtschin, Ludwigshafen (DE); Frank Dietsche, Ludwigshafen (DE); Jan Uwe Mueller, Ludwigshafen (DE); Alejandra Garcia Marcos, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 126 days.

(21) Appl. No.: 16/485,188

(22) PCT Filed: Feb. 2, 2018

(86) PCT No.: PCT/EP2018/052609
§ 371 (c)(1),
(2) Date: Aug. 12, 2019

(87) PCT Pub. No.: WO2018/146005
PCT Pub. Date: Aug. 16, 2018

(65) Prior Publication Data
US 2019/0390012 A1    Dec. 26, 2019

(30) Foreign Application Priority Data
Feb. 13, 2017 (EP) ................. 17155821

(51) Int. Cl.
*C08G 73/02* (2006.01)
(52) U.S. Cl.
CPC ................ *C08G 73/0213* (2013.01)
(58) Field of Classification Search
None
See application file for complete search history.

(56) References Cited

U.S. PATENT DOCUMENTS

| | | | |
|---|---|---|---|
| 4,935,162 A | 6/1990 | Barthold et al. | |
| 5,445,765 A | 8/1995 | Elfers et al. | |
| 5,565,145 A * | 10/1996 | Watson ................ | C11D 1/44 510/350 |
| 6,300,304 B1 | 10/2001 | Boeckh et al. | |
| 6,811,601 B2 | 11/2004 | Borzyk et al. | |
| 9,738,754 B2 | 8/2017 | Ebert et al. | |
| 2007/0275868 A1 | 11/2007 | Cooremans et al. | |
| 2013/0284211 A1* | 10/2013 | Garcia Marcos ....... | C11D 11/02 134/25.2 |
| 2014/0238868 A1 | 8/2014 | Li et al. | |
| 2015/0361381 A1* | 12/2015 | Ebert .................. | C11D 3/3723 510/218 |
| 2016/0090554 A1* | 3/2016 | Wang ................... | C11D 3/378 510/230 |

FOREIGN PATENT DOCUMENTS

| | | |
|---|---|---|
| CN | 101448925 A | 6/2009 |
| CN | 105492495 A | 4/2016 |
| EP | 3118241 A1 | 1/2017 |
| JP | 2003535183 A | 11/2003 |
| JP | 2014162995 A | 9/2014 |
| WO | 2014131584 A2 | 9/2014 |
| WO | 2016135000 A1 | 9/2016 |
| WO | 2018153876 A1 | 8/2018 |

OTHER PUBLICATIONS

European Search Report for EP Application No. 17155821.6, dated Aug. 3, 2017, 3 pages.
International Search Report and Written Opinion issued in PCT/EP2018/052609 dated Apr. 24, 2018 9 pages.

* cited by examiner

*Primary Examiner* — Tae H Yoon
(74) *Attorney, Agent, or Firm* — Armstrong Teasdale LLP

(57) ABSTRACT

Described herein is a process for manufacturing an alkoxylated polyalkylenimine, the process including the following steps:
(a) providing a polyalkylenimine (A),
(b) reacting the polyalkylenimine (A) with 0.5 to 1.3 moles of propylene oxide or butylene oxide per N—H function at a temperature in the range of 100 to 150° C.,
(c) reacting the product from step (b) with $C_2$-$C_4$-alkylene oxide wherein the $C_2$-$C_4$-alkylene oxide is different from the alkylene oxide used in step (b).

11 Claims, No Drawings

PROCESS FOR MAKING AN ALKOXYLATED POLYALKYLENIMINE

CROSS-REFERENCE TO RELATED APPLICATIONS

This application is the national stage entry of PCT/EP2018/052609, filed on Feb. 2, 2018, which claims the benefit of priority to European Patent Application No. 17155821.6, filed Feb. 13, 2017, each of which is incorporated by reference in its entirety herein.

The present invention is directed towards a process for manufacturing an alkoxylated polyalkylenimine, said process comprising the following steps:
(a) providing a polyalkylenimine (A),
(b) reacting said polyalkylenimine (A) with from 0.5 to 1.3 moles of propylene oxide or butylene oxide per N—H function at a temperature in the range of from 100 to 150° C.,
(c) reacting the product from step (b) with $C_2$-$C_4$-alkylene oxide wherein said $C_2$-$C_4$-alkylene oxide is different from the alkylene oxide used in step (b).

BACKGROUND

Alkoxylated polyalkylenimines have found numerous applications such as, but not limited to dispersing pigments, furthermore as demulsifying agents and defoaming agents. The properties as pigment dispersants may be used in applications like hard surface cleaning including metal surface cleaning, automatic dishwashing, furthermore fiber cleaning and oil field applications such as oil demulsification, see, e. g., U.S. Pat. Nos. 4,935,162 and 5,445,765.

Alkoxylated polyalkylenimines are usually synthesized by alkoxylating, for example ethoxylating or propoxylating a polyalkylenimine, for example a polypropylenimine or in particular a polyethylenimine.

For some applications, colorless alkoxylated polyalkylenimines are desired because many end-users assign dark products with dirt. However, many processes—especially if run at higher temperatures—yield brownish products, and in particular high-molecular products have dark appearances.

Although it has been found that reacting polyalkylenimine with one about equivalent alkylene oxide per NH-function first, the so-called incipient alkoxylation, and to then convert with more alkylene oxide, for example EP 3118241 and WO 2016/135000, the color of the resulting products is still quite dark. In addition, many ethoxylation products contain considerable amounts of polyalkylene glycols, such as, for example polypropylene glycol and polyethylene glycol, which may be undesired in many applications. The removal of polyethylene glycol from alkoxylated polyalkylenimine is tedious.

DETAILED DESCRIPTION

It was therefore an objective of the present invention to provide a process for manufacturing an alkoxylated polyalkylenimine that avoids the above disadvantages. It was further an objective to provide alkoxylated polyalkylenimines with improved properties such as purity and color number.

Accordingly, the process defined at the outset has been defined.

In the context of the present invention, the process defined at the outset is also referred to as "inventive process" or as "process according to the present invention". The inventive process comprises the following steps, hereinafter also referred to as step (a), step (b) or step (c), as the case may be:
(a) providing a polyalkylenimine (A),
(b) reacting said polyalkylenimine (A) with from 0.5 to 1.3 moles of propylene oxide or butylene oxide per N—H function at a temperature in the range of from 100 to 160° C.,
(c) reacting the product from step (b) with $C_2$-$C_4$-alkylene oxide wherein said $C_2$-$C_4$-alkylene oxide is different from the alkylene oxide used in step (b).

Step (a), step (b) and step (c) are hereinafter described in more detail.

Step (a) is providing a polyalkylenimine (A). Polyalkenimines are selected from polyethylenimines, polypropylenimines and polymers of higher diamines, for example α,ω-diamines such as 1,4-butandiamine and 1,6-hexandiamine. In the context of the present invention, polyalkylenimines preferably bear at least an average of 5 nitrogen atoms per molecule. Such polyethylenimines may hereinafter also be referred to as polyethylenimine (A), and such polypropylenimines may hereinafter also be referred to as polypropylenimine (A).

In one embodiment of the present invention, polyalkylenimines (A) display a polydispersity $Q=M_w/M_n$ of at least 3.5, preferably in the range of from 3.5 to 10, more preferably in the range of from 4 to 9 and even more preferably from 4.0 to 5.5. In other embodiments of the present invention, polyalkylenimines (A) display a polydispersity $Q=M_w/M_n$ of 3.4 at most, for examples in the range of from 1.1 to 3.0, more preferably in the range of from 1.3 to 2.5 and even more preferably from 1.5 to 2.0.

The average molecular weight $M_w$ of polyalkylenimines (A) is in the range of from 550 to 100,000 g/mol, preferably up to 50,000 g/mol and more preferably from 800 up to 25,000 g/mol. The average molecular weight $M_w$ of polyalkylenimines (A) may be determined by gel permeation chromatography (GPC), with 1.5% by weight aqueous formic acid as eluent and cross-linked poly-hydroxyethyl methacrylate as stationary phase.

The term "polyethylenimines (A)" in the context of the present invention does not only refer to polyethylenimine homopolymers but also to polyalkylenimines containing NH—$CH_2$—$CH_2$—NH structural elements together with other alkylene diamine structural elements, for example NH—$CH_2$—$CH_2$—$CH_2$—NH structural elements, NH—$CH_2$—$CH(CH_3)$—NH structural elements, NH—$(CH_2)_4$—NH structural elements, NH—$(CH_2)_6$—NH structural elements or (NH—$(CH_2)_8$—NH structural elements but the NH—$CH_2$—$CH_2$— NH structural elements being in the majority with respect to the molar share. Preferred polyethylenimines contain NH—$CH_2$—$CH_2$—NH structural elements being in the majority with respect to the molar share, for example amounting to 60 mol-% or more, more preferably amounting to at least 70 mol-%, referring to all alkylenimine structural elements. In a special embodiment, the term polyethylenimine refers to those polyalkylenimines that bear only one or zero alkylenimine structural element per molecule that is different from NH—$CH_2$—$CH_2$—NH.

The term "polypropylenimine (A)" in the context of the present invention does not only refer to polypropylenimine homopolymers but also to polyalkylenimines containing NH—$CH_2$—$CH(CH_3)$—NH structural elements together with other alkylene diamine structural elements, for example NH—$CH_2$—$CH_2$—$CH_2$—NH structural elements, NH—$CH_2$—$CH_2$—NH structural elements, NH—$(CH_2)_4$—NH structural elements, NH—$(CH_2)_6$—NH structural elements or (NH—(CH$_2$)$_8$—NH structural elements but the NH—CH$_2$—CH(CH$_3$)—NH structural elements being in the majority with respect to the molar share. Preferred polypropylenimines contain NH—CH$_2$—CH(CH$_3$)—NH structural elements being in the majority with respect to the molar share, for example amounting to 60 mol-% or more, more preferably amounting to at least 70 mol-%, referring to all alkylenimine structural elements. In a special embodiment, the term polypropylenimine refers to those polyalkylenimines that bear only one or zero alkylenimine structural element per polypropylenimine molecule that is different from NH—CH$_2$—CH(CH$_3$)—NH.

Branches may be alkylenamino groups such as, but not limited to —CH$_2$—CH$_2$—NH$_2$ groups or (CH$_2$)$_3$—NH$_2$-groups. Longer branches may be, for examples, —(CH$_2$)$_3$—N(CH$_2$CH$_2$CH$_2$NH$_2$)$_2$ or —(CH$_2$)$_2$—N(CH$_2$CH$_2$NH$_2$)$_2$ groups. Highly branched polyethylenimines are, e.g., polyethylenimine dendrimers or related molecules with a degree of branching in the range from 0.25 to 0.95, preferably in the range from 0.30 to 0.80 and particularly preferably at least 0.5. The degree of branching can be determined for example by $^{13}$C-NMR or $^{15}$N-NMR spectroscopy, preferably in D$_2$O, and is defined as follows:

$$DB=D+T/D+T+L$$

with D (dendritic) corresponding to the fraction of tertiary amino groups, L (linear) corresponding to the fraction of secondary amino groups and T (terminal) corresponding to the fraction of primary amino groups.

Within the context of the present invention, branched polyethylenimines (A) are polyethylenimines (A) with DB in the range from 0.25 to 0.95, particularly preferably in the range from 0.30 to 0.90% and very particularly preferably at least 0.5.

In the context of the present invention, CH$_3$-groups are not being considered as branches.

Preferred polyethylenimines (A) are those that exhibit little or no branching, thus predominantly linear or linear polyethylenimine backbones. In another embodiment, preferred polyethylenimines (A) are branched polyethylenimines (A).

In a special embodiment of the present invention, polyethylenimines (A) have a primary amine value in the range of from 1 to 1000 mg KOH/g, preferably from 10 to 500 mg KOH/g, most preferred from 50 to 300 mg KOH/g. The primary amine value can be determined according to ASTM D2074-07.

In one embodiment of the present invention polyethylenimines (A) have a secondary amine value in the range of from 10 to 1000 mg KOH/g, preferably from 50 to 500 mg KOH/g, most preferred from 50 to 500 mg KOH/g. The secondary amine value can be determined according to ASTM D2074-07.

In a special embodiment of the present invention polyethylenimines (A) have a tertiary amine value in the range of from 1 to 300 mg KOH/g, preferably from 5 to 200 mg KOH/g, most preferred from 10 to 100 mg KOH/g. The tertiary amine value can be determined according to ASTM D2074-07.

The molar share of tertiary N atoms may be determined by $^{15}$N-NMR spectroscopy. In cases that tertiary amine value and result according to $^{13}$C-NMR spectroscopy are inconsistent, the results obtained by $^{13}$C-NMR spectroscopy will be given preference.

In step (a), polyalkylenimine (A) may be provided in bulk or in solution, in bulk being preferred. In order to carry out step (b), in a preferred embodiment of the present invention the water content of polyalkylenimine (A) provided in step (a) is in the range of from 5 to 25% by weight of water, referring to polyalkylenimine (A).

In step (b) of the inventive process, said polyalkylenimine (A) is reacted with from 0.5 to 1.3 moles of propylene oxide or butylene oxide per N—H function at a temperature in the range of from 100 to 160° C., preferred is propylene oxide.

In one embodiment of step (b), polyalkylenimine and—particularly preferably—polyethylenimine (A) is reacted with a portion of the total amount of C$_3$-C$_4$-alkylene oxide used that corresponds to 0.7 to 1 and preferably from 0.7 to 0.95 moles of propylene oxide or butylene oxide per mole of NH moiety.

Preferably, step (b) is carried out in the absence of a catalyst.

In one embodiment of the present invention, step (b) is performed in the presence of 0.1 to 4.0% by weight of water, referring to polyalkylenimine (A).

In one embodiment of the present invention, step (b) is performed at a reaction temperature from 90 to 150° C., preferably from 125 to 145° C.

In one embodiment of the present invention, step (b) may be carried out at a pressure of up to 15 bar, preferably up to 10 bar, for example 1 to 8 bar. Preferred vessels for carrying out step (b) are autoclaves and tubular reactors.

In step (c), the product from step (b) is reacted with C$_2$-C$_4$-alkylene oxide wherein said C$_2$-C$_4$-alkylene oxide is different from the alkylene oxide used in step (b). For example, in embodiments wherein propylene oxide is used in step (b), in step (c) ethylene oxide or butylene oxide or mixtures therefrom are used, in particular ethylene oxide. In another example, in embodiments wherein butylene oxide is used in step (b), in step (c) ethylene oxide or propylene oxide or mixtures therefrom are used, in particular ethylene oxide.

Step (c) is typically carried out in the presence of a catalyst, for example a base or a double-metal cyanide.

In one embodiment of the present invention, step (c) of the inventive process is carried out in the presence of a base. Suitable bases such as potassium hydroxide, sodium hydroxide, sodium or potassium alkoxides such as potassium methylate (KOCH$_3$), potassium tert-butoxide, sodium ethoxide and sodium methylate (NaOCH$_3$), preferably from potassium hydroxide and sodium hydroxide. Further examples of catalysts are alkali metal hydrides and alkaline earth metal hydrides such as sodium hydride and calcium hydride, and alkali metal carbonates such as sodium carbonate and potassium carbonate. Preference is given to the alkali metal hydroxides, preference being given to potassium hydroxide and sodium hydroxide, and to alkali metal alkoxides, particular preference being given to potassium t-butoxide in t-butanol, sodium n-hexanolate in n-hexanol, and to sodium methanolate in n-nonanol. Typical use amounts for the base are from 0.05 to 10% by weight, in particular from 0.5 to 2% by weight, based on the total amount of polyethylenimine (A) and C$_2$-C$_4$-alkylene oxide.

In one embodiment of the present invention, step (c) of the inventive process is carried out in the presence of a double-metal cyanide. Double-metal cyanides, hereinafter also referred to as double metal cyanide compounds or DMC compounds, usually comprise at least two different metals, at least one of them being selected from transition metals and the other one being selected from transition metals and alkali earth metals, and furthermore cyanide counterions. Particularly suitable catalysts for the alkoxylation are double-metal cyanide compounds which contain zinc, cobalt or iron or two thereof. Berlin blue, for example, is particularly suitable.

Preference is given to using crystalline DMC compounds. In a preferred embodiment, a crystalline DMC compound of the Zn—Co type which comprises zinc acetate as further metal salt component is used as catalyst. Such compounds crystallize in monoclinic structure and have a platelet-like habit.

In one embodiment of the present invention, the inventive synthesis is carried out in the presence of at least one double-metal cyanide selected from hexacyano cobaltates.

In one embodiment of the present invention, the inventive synthesis is carried out in the presence of at least one double-metal cyanide selected from compounds according to general formula (I)

$$M^1_a[M^2(CN)_b(A)_c]_d \cdot fM^1_g X_m \cdot h(H_2O) \cdot eL \cdot kP \qquad (I),$$

wherein
$M^1$ is at least one metal ion chosen from the group consisting of $Zn^{2+}$, $Fe^{2+}$, $Fe^{3+}$, $Co^{3+}$, $Ni^{2+}$, $Mn^{2+}$, $Co^{2+}$, $Sn2+$, $Pb^{2+}$, $Mo^{4+}$, $Mo^{6+}$, $Al^{3+}$, $V^{4+}$, $V^{5+}$, $Sr^{2+}$, $W^{4+}$, $W^{6+}$, $Cr^{2+}$, $Cr^{3+}$, $Cd^{2+}$, $Hg^{2+}$, $Pd^{2+}$, $Pt^{2+}$, $V^{2+}$, $Mg^{2+}$, $Ca^{2+}$, $Ba^{2+}$, $Cu^{2+}$, $La^{3+}$, $Ce^{3+}$, $Ce^{4+}$, $Eu^{3+}$, $Ti^{3+}$, $Ti^{4+}$, $Ag^+$, $Rh^{2+}$, $Rh^{3+}$, $Ru^{2+}$, $Ru^{3+}$,
$M^2$ is at least one metal ion chosen from the group consisting of $Fe^{2+}$, $Fe^{3+}$, $Co^{2+}$, $Co^{3+}$, $Mn^{2+}$, $Mn^{3+}$, $V^{4+}$, $V^{5+}$, $Cr^{2+}$, $Cr^{3+}$, $Rh^{3+}$, $Ru^{2+}$, $Ir^{3+}$,
and in a way that $M^1$ and $M^2$ are not identical,
A and X, independently of one another, are anions selected from the group consisting of halide, hydroxide, sulfate, carbonate, cyanide, thiocyanate, isocyanate, cyanate, carboxylate, oxalate, nitrate, nitrosyl, hydrogensulfate, phosphate, dihydrogenphosphate, hydrogenphosphate or hydrogencarbonate,
L is a ligand chosen from the group consisting of alcohols, aldehydes, ketones, ethers, polyethers, esters, polyesters, polycarbonate, ureas, amides, primary, secondary and tertiary amines, ligands with pyridine nitrogen, nitriles, sulfides, phosphides, phosphites, phosphanes, phosphonates and phosphates,
k is greater than or equal to zero, and up to 6. The variable k can be a whole number or a fraction.
P is an organic additive, selected for example from polyethers, polyesters, polycarbonates, polyalkylene glycol sorbitan esters, polyalkylene glycol glycidyl ethers, polyacrylamides, poly(acrylamide-co-acrylic acid), polyacrylic acids, poly(acrylamide-co-maleic acid), polyacrylonitriles, polyalkyl acrylates, polyalkyl methacrylates, polyvinyl methyl ethers, polyvinyl ethyl ethers, polyvinyl acetates, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymer, maleic acid and maleic anhydride copolymers, hydroxyethylcellulose, polyacetates, ionic surface-active and interface-active compounds, bile acid or salts thereof, esters or amides, carboxylic esters of polyhydric alcohols and glycosides.
a, b, c, d, g and n are chosen such that the electroneutrality of the compound (I) is ensured, where each f and c may be 0,
e is the number of ligand molecules, for example a fraction or an integer greater than zero, or zero,
f and h, independently of one another, are fractions or integers greater than zero, or zero.
In one embodiment, the upper limits of e, f, and h are each 6.

Double-metal cyanide compounds can be used as powder, paste or suspension or be moulded to give a moulding, be introduced into mouldings, foams or the like or be applied to mouldings, foams or the like.

Preferably, the DMC compound concentration used for step (c), based on product obtained in step (b), is from 5 to 2000 ppm (i.e. mg of catalyst per kg of product), preferably less than 1000 ppm, in particular less than 500 ppm, particularly preferably less than 100 ppm, for example less than 50 ppm or 35 ppm, particularly preferably less than 25 ppm; ppm referring to mass-ppm (parts per million) of compound obtained in step (b).

Step (c) may be carried out in bulk, embodiment (i), or in an organic solvent, embodiment (ii). In embodiment (i), water can be removed from the product obtained in step (b). Such water removal can be done by heating to a temperature in the range of from 80 to 150° C. under a reduced pressure in the range of from 0.01 to 0.5 bar and distilling off the water.

In one embodiment of the present invention, step (c) is carried out at a reaction temperature in the range of from 70 to 200° C. and preferably from 100 to 180° C.

In one embodiment of the present invention, step (c) is carried out at a pressure of up to 10 bar and in particular up to 8 bar, for example 1 to 8 bar.

In one embodiment of the present invention, the reaction time of step (c) is generally in the range of from 0.5 to 12 hours.

Examples of suitable organic solvents for embodiment (ii) of step (c) are nonpolar and polar aprotic organic solvents. Examples of particularly suitable nonpolar aprotic solvents include aliphatic and aromatic hydrocarbons such as hexane, cyclohexane, toluene and xylene. Examples of particularly suitable polar aprotic solvents are ethers, in particular cyclic ethers such as tetrahydrofuran and 1,4-dioxane, furthermore N,N-dialkylamides such as dimethylformamide and dimethylacetamide, and N-alkyllactams such as N-methylpyrrolidone. It is as well possible to use mixtures of at least two of the above organic solvents. Preferred organic solvents are xylene and toluene.

In embodiment (ii), the solution obtained in the first step, before or after addition of catalyst and solvent, is dewatered before being subjected to alkylene oxide, said water removal advantageously being done by removing the water at a temperature in the range of from 120 to 180° C., preferably supported by a stream of nitrogen. The subsequent reaction with the alkylene oxide may be effected as in embodiment (i). In embodiment (i), alkoxylated polyalkylenimines according to the invention is obtained directly in bulk and may be dissolved in water, if desired. In embodiment (ii), for work-up organic solvent is typically replaced by water. Alkoxylated polyalkylenimines (B) according to the invention may alternatively be isolated in bulk.

An—optional—step of work-up may include the deactivation of catalyst used in step (c).

The inventive process does not require bleaching steps or reductive removal of impurities.

By the inventive process, alkoxylated polyalkylenimines with improved properties such as purity and color number are obtained. In particular, by the inventive process a lower amount of polyethyleneglycol is formed.

Another aspect of the present invention relates to ethoxylated polyalkylenimines, hereinafter also referred to as inventive ethoxylated polyalkylenimines (B). Inventive ethoxylated polyalkylenimines (B) contain in the range of from 0.1 to 2.5% by weight of polyalkylene glycol. The vast majority of such polyalkylene glycol is polyethylene glycol. Therefore, polyalkylene glycols other than polyethylene glycol are usually neglected in the context of the present invention, and such polyalkylene glycol is also referred to as polyethylene glycol. Such pure ethoxylated polyalkylenimines (B) are particularly useful for various applications. The contents of polyethyleneglycol may be determined by high-performance thin-layer chromatography, for example with Dragendorff's reagent as indicator. In a specific embodiment, inventive ethoxylated polyalkylenimines (B) contain in the range of from 0.1 to 2.5% by weight of polyethylene glycol and no measurable amounts of polyalkylene glycols other than polyethylene glycol.

Inventive ethoxylated polyalkylenimines (B) bear 0.5 to 1.3 moles of propylene oxide or butylene oxide per N—H function of the backbone polyalkylenimine. Preferably, inventive ethoxylated polyalkylenimines (B) bear in addition 3 to 50 ethylene oxide units per N—H function of the backbone polyalkylenimine, preferably 5 to 30 units.

Inventive ethoxylated polyalkylenimines (B) are preferably made in accordance with the inventive process.

In a preferred embodiment of the present invention, inventive ethoxylated polyalkylenimines (B) have a Hazen color number in the range of from 10 to 350, determined according to DIN ISO 6271 ASTM D 1209. The Hazen colour number can preferably be determined by spectrophotometric means on a 10 wt. % aqueous solution.

In a preferred embodiment of the present invention, inventive ethoxylated polyalkylenimines (B) have an iodine number in the range of from about zero to 2, determined according to DIN 6162:2014-09 on a 10 wt. % aqueous solution.

In a preferred embodiment of the present invention, inventive ethoxylated polyalkylenimines (B) are selected from ethoxylated polyethylenimines (B) and ethoxylated polypropylenimines (B).

In one embodiment of the present invention, the average molecular weight $M_w$ of inventive ethoxylated polyethylenimine (B) is in the range of from 2,500 to 1,500,000 g/mol, preferably up to 500,000 g/mol and more preferably up to 100,000 g/mol. The average molecular weight $M_w$ of inventive ethoxylated polyethylenimine (B) may be determined by gel permeation chromatography (GPC), with 1.5% by weight aqueous formic acid as eluent and cross-linked poly-hydroxyethylmethacrylate as stationary phase.

Inventive ethoxylated polyalkylenimines are particularly suitable in cleaning agents such as, but not limited to laundry detergents and hard surface cleaners.

WORKING EXAMPLES

General remarks: The Hazen colour number was determined according to DIN ISO 6271, ASTM D 1209, with spectrophotometric detection. (2° norm observer, normal light, layer thickness 11 mm, against distilled water).

The content of polyethylene glycol was determined by high-performance thin-layer chromatography, in accordance with DGF Einheitsmethoden zur Untersuchung von Fetten, Tensiden und verwandten Stoffen. Mobile phase: $CHCl_3$/$CH_3OH$/water 88:11:1 by vol, analysis by Dragendorff's reagent $BiONO_3$ in acetic acid —KI (potassium iodide) in glacial acetic acid (reagent part A) and $BaCl_2$ in water (reagent B). Stationary phase: HPTLC plates, Silica 60 $F_{254}$, 20·10 cm;

Percentages are weight percent unless expressly indicated otherwise.

I. Starting Materials

The following polyethylenimines (A) were used as starting materials:
(A.1): polyethylenimine, amine no. 18.2 mmol KOH/g, $M_n$ of 600 g/mol, $M_w/M_n$=1.6
(A.2): polypropylenimine, linear, amine no. 17.4 mmol KOH/g, $M_n$ of 1,300 g/mol, $M_w/M_n$=2.3
(A.3): polyethylenimine, amine no. 17.2 mmol KOH/g, $M_n$ of 5,100 g/mol, $M_w/M_n$=1.8
(A.4): polyethylenimine, amine no. 18.0 mmol KOH/g, $M_n$ of 1,200 g/mol, $M_w/M_n$=1.7
(A.5): polyethylenimine, amine no. 17.0 mmol KOH/g, $M_n$ of 25,000 g/mol, $M_w/M_n$=3.6

Polyethylenimines (A.1), (A.3), (A.4) and (A.5) were obtained by polymerization of ethylenimine and were highly branched.

TABLE 1

Overview over syntheses

| | backbone | Step (b) AO eq NH | Stage-1 alkoxylate | Step (c) EO/eq NH | Catalyst | Time for step (c) [h] |
|---|---|---|---|---|---|---|
| (B.1A) | (A.1) | 0.9 PO | stage1-propoxylate 1 | 20 | KOH | 12.6 |
| C-(B.1A) | (A.1) | 0.9 PO | C-stage1-propoxylate 1* | 20 | KOH | 13.8 |
| (B.1B) | (A.1) | 0.7 PO | stage1-propoxylate 2 | 20 | KOH | 12.9 |
| (B.1C) | (A.1) | 0.5 PO | stage1-propoxylate 3 | 20 | KOH | 13.3 |
| (B.1D) | (A.1) | 1.2 PO | stage1-propoxylate 4 | 20 | KOH | 12.6 |
| C-(B.1D) | (A.1) | 3.0 PO | C-stage1-propoxylate 5 | 20 | KOH | 13.8 |
| (B.1E) | (A.1) | 1.2 PO | stage1-propoxylate 4 | 20 | $NaOCH_3$ | 11.2 |
| C-(B.1F) | (A.1) | 0.9 EO | stage1-ethoxylate 1 | 20 | KOH | 16.6 |
| C-(B.1G) | (A.1) | 0.9 EO | stage1-ethoxylate 1 | 20 | $NaOCH_3$ | 14.9 |
| (B.2A) | (A.2) | 0.9 PO | stage1-propoxylate 5 | 12 | KOH | 11.3 |
| C-(B.2B) | (A.2) | 0.9 EO | stage1-ethoxylate 2 | 12 | KOH | 14.2 |
| (B.3A) | (A.3) | 0.9 PO | stage1-propoxylate 6 | 25 | $NaOCH_3$ | 14.4 |
| C-(B.3B) | (A.3) | 0.9 EO | stage1-ethoxylate 3 | 25 | $NaOCH_3$ | 17.5 |
| (B.4A) | (A.4) | 0.7 PO | stage1-propoxylate 7 | 30 | KOH | 14.1 |
| C-(B.4B) | (A.4) | 0.9 EO | stage1-ethoxylate 4 | 30 | KOH | 18.1 |
| (B.5A) | (A.5) | 0.7 PO | stage1-propoxylate 8 | 12 | $NaOCH_3$ | 11.7 |
| C-(B.5B) | (A.5) | 0.9 EO | stage1-ethoxylate 5 | 12 | $NaOCH_3$ | 14.3 |

*step (b) at 90° C.

II. Synthesis of Alkoxylated Polyalkylenimines

II.1 Steps (b)—Comparative Examples

II.1.1 Synthesis of Stage 1-Ethoxylate 1

A 200-l autoclave with propeller stirrer was charged with 72.5 kg of polyethylenimine (A.1) and 11.9 kg of water and then evacuated (5 min, 10 mbar) and purged with nitrogen three times. Then, the autoclave was heated (180 rpm) to an inside temperature of 137° C. An amount of 68.1 kg of ethylene oxide that corresponds to 0.9 eq EO/NH was added within 4½ hours under stirring and allowed to react for additional 45 minutes at 130° C. The mixture so obtained was cooled to 90° C., and the volatile ingredients were removed in vacuo. An amount of 147.8 kg of a highly viscous brownish liquid, "stage 1-ethoxylate 1" was obtained.

II.1.2 Synthesis of Stage 1-Ethoxylate 2

A 200-l autoclave with propeller stirrer was charged with 68 kg of polypropylenimine (A.2) and 10.1 kg of water and then evacuated and purged with nitrogen three times. Then, the autoclave was heated to 137° C. An amount of 61.1 kg of ethylene oxide that corresponds to 0.9 eq EO/NH was added within 4½ hours under stirring and allowed to react for additional 45 Minutes at 130° C. The mixture so obtained was cooled to 90° C., and the volatile ingredients were removed in vacuo. An amount of 137.9 kg of a highly viscous brownish liquid, "stage 1-ethoxylate 2" was obtained.

II.1.3 Synthesis of Stage 1-Ethoxylate 3

A 200-l autoclave with propeller stirrer was charged with 72.5 kg of polyethylenimine (A.3) and 11.5 kg of water and then evacuated and purged with nitrogen three times. Then, the autoclave was heated to 138° C. An amount of 64.4 kg of ethylene oxide that corresponds to 0.9 eq EO/NH was added within 4½ hours under stirring and allowed to react for additional 45 Minutes at 130° C. The mixture so obtained was cooled to 90° C., and the volatile ingredients were removed in vacuo. An amount of 143 kg of a highly viscous brownish liquid, "stage 1-ethoxylate 3" was obtained.

II.1.4 Synthesis of Stage 1-Ethoxylate 4

A 200-l autoclave with propeller stirrer was charged with 72.5 g of polyethylenimine (A.4) and 11.8 kg of water and then evacuated and purged with nitrogen three times. Then, the autoclave was heated to 136° C. An amount of 68 kg of ethylene oxide that corresponds to 0.7 eq EO/NH was added within 4½ hours under stirring and allowed to react for additional 45 Minutes at 130° C. The mixture so obtained was cooled to 80° C., and the volatile ingredients were removed in vacuo. An amount of 147.3 kg of a highly viscous brownish liquid, "stage 1-ethoxylate 4" was obtained.

II.1.5 Synthesis of Stage 1-Ethoxylate 5

A 200-l autoclave with propeller stirrer was charged with 78 kg of polyethylenimine (A.5) and 12 kg of water and then evacuated and purged with nitrogen three times. Then, the autoclave was heated to 125° C. An amount of 69.2 kg of ethylene oxide that corresponds to 0.7 eq EO/NH was added within 4½ hours under stirring and allowed to react for additional 45 Minutes at 130° C. The mixture so obtained was cooled to 80° C., and the volatile ingredients were removed in vacuo. An amount of 156.8 kg of a highly viscous brownish liquid, "stage 1-ethoxylate 5" was obtained.

II.1.6 Synthesis of C-Stage 1-Propoxylate 1

A 200-l autoclave with propeller stirrer was charged with 67 kg of polyethylenimine (A.1) and 10.1 kg of water and then evacuated (5 min, 10 mbar) and purged with nitrogen three times. Then, the autoclave was heated (180 rpm) to obtain an inside temperature of 90° C. An amount of 79.4 kg of propylene oxide that corresponds to 0.9 eq PO/NH was added within 10 hours under stirring and allowed to react for additional 60 minutes at 130° C. The mixture so obtained was cooled to 90° C., and the volatile ingredients were removed in vacuo. An amount of 153.5 kg of a highly viscous brownish liquid, a comparative "stage 1-propoxylate 1" was obtained.

II.1.7 Synthesis of Stage 1-Propoxylate 1 (3PO)

A 200-l autoclave with propeller stirrer was charged with 26.8 kg of polyethylenimine (A.1) and 4 kg of water and then evacuated (5 min, 10 mbar) and purged with nitrogen three times. Then, the autoclave was heated (180 rpm) to obtain an inside temperature of 135° C. An amount of 105.9 kg of propylene oxide that corresponds to 3.0 eq PO/NH was added within 7.5 hours under stirring and allowed to react for additional 60 minutes at 130° C. The mixture so obtained was cooled to 90° C., and the volatile ingredients were removed in vacuo. An amount of 135.5 kg of a highly viscous yellow-brownish liquid, a comparative C-"stage 1-propoxylate 5" was obtained.

II.2. Steps (b)—Inventive Examples

II.2.1 Synthesis of Stage 1-Propoxylate 1

A 200-l autoclave with propeller stirrer was charged with 67 kg of polyethylenimine ((A.1)) and 10.1 kg of water and then evacuated (5 min, 10 mbar) and purged with nitrogen three times. Then, the autoclave was heated (180 rpm) to obtain an inside temperature of 136° C. An amount of 79.4 kg of propylene oxide that corresponds to 0.9 eq PO/NH was added within 4½ hours under stirring and allowed to react for additional 60 minutes at 130° C. The mixture so obtained was cooled to 90° C., and the volatile ingredients were removed in vacuo. An amount of 153 kg of a highly viscous yellowish liquid, "stage 1-propoxylate 1" was obtained.

II.2.2 Synthesis of Stage 1-Propoxylate 2

A 200-l autoclave with propeller stirrer was charged with 72 kg of polyethylenimine (A.1) and 11.3 kg of water and then evacuated and purged with nitrogen three times. Then, the autoclave was heated to 136-138° C. An amount of 66 kg of propylene oxide that corresponds to 0.7 eq PO/NH was added within 4½ hours under stirring and allowed to react for additional 60 minutes at 130° C. The mixture so obtained was cooled to 90° C., and the volatile ingredients were removed in vacuo. An amount of 144.5 kg of a highly viscous yellow liquid, "stage 1-propoxylate 2" was obtained.

II.2.3 Synthesis of Stage 1-Propoxylate 3

A 200-l autoclave with propeller stirrer was charged with 76 kg g of polyethylenimine (A.1) and 11.9 kg of water and then evacuated and purged with nitrogen three times. Then, the autoclave was heated to 136-138° C. An amount of 50 kg of propylene oxide that corresponds to 0.5 eq PO/NH was added within 4½ hours under stirring and allowed to react for additional 60 minutes at 130° C. The mixture so obtained was cooled to 90° C., and the volatile ingredients were removed in vacuo. An amount of 132.5 kg of a highly viscous yellow liquid, "stage 1-propoxylate 3" was obtained.

II.2.4 Synthesis of Stage 1-Propoxylate 4

A 200-l autoclave with propeller stirrer was charged with 55 kg of polyethylenimine (A.1) and 8.2 kg of water and then evacuated and purged with nitrogen three times. Then, the autoclave was heated to 136-138° C. An amount of 86.9 kg of propylene oxide that corresponds to 1.2 eq PO/NH was added within 4½ hours under stirring and allowed to react for 60 minutes at 130° C. The mixture so obtained was cooled to 90° C., and the volatile ingredients were removed in vacuo. An amount of 145.5 kg of a highly viscous yellow liquid, "stage 1-propoxylate 4" was obtained.

II.2.5 Synthesis of Stage 1-Propoxylate 5

A 200-l autoclave with propeller stirrer was charged with 68 kg of linear polypropylenimine (A.2) and 10.1 kg of water and then evacuated and purged with nitrogen three times. Then, the autoclave was heated to 136-138° C. An amount of 77.6 kg of propylene oxide that corresponds to 0.9 eq PO/NH was added within 4½ hours under stirring and allowed to react for 60 minutes at 130° C. The mixture so obtained was cooled to 90° C., and the volatile ingredients were removed in vacuo. An amount of 151.9 kg of a highly viscous yellow liquid, "stage 1-propoxylate 5" was obtained.

II.2.6 Synthesis of Stage 1-Propoxylate 6

A 200 l autoclave with propeller stirrer was charged with 70 kg of polyethylenimine (A.3) and 11 kg of water and then evacuated and purged with nitrogen three times. Then, the autoclave was heated to 136-138° C. An amount of 79 kg of propylene oxide that corresponds to 0.9 eq PO/NH was added within 4½ hours under stirring and allowed to react for additional 60 minutes at 130° C. The mixture so obtained was cooled to 80° C., and the volatile ingredients were removed in vacuo. An amount of 157.5 kg of a highly viscous yellow liquid, "stage 1-propoxylate 6" was obtained.

II.2.7 Synthesis of Stage 1-Propoxylate 7

A 200 l autoclave with propeller stirrer was charged with 70 kg of polyethylenimine (A.4) and 10.9 kg of water and then evacuated and purged with nitrogen three times. Then, the autoclave was heated to 136-138° C. An amount of 83.4 kg of propylene oxide that corresponds to 0.7 eq PO/NH was added within 4½ hours under stirring and allowed to react for additional 60 minutes at 130° C. The mixture so obtained was cooled to 90° C., and the volatile ingredients were removed in vacuo. An amount of 158.5 kg of a highly viscous yellow liquid, "stage 1-propoxylate 7" was obtained.

II.2.8 Synthesis of Stage 1-Propoxylate 8

A 200-l autoclave with propeller stirrer was charged with 72.5 kg of polyethylenimine (A.5) and 10.7 kg of water and then evacuated and purged with nitrogen three times. Then, the autoclave was heated to 136-138° C. An amount of 81.7 kg of propylene oxide that corresponds to 0.7 eq PO/NH was added within 4½ hours under stirring and allowed to react for additional 60 minutes at 130° C. The mixture so obtained was cooled to 90° C., and the volatile ingredients were removed in vacuo. An amount of 157.5 kg of a highly viscous yellow liquid, "stage 1-propoxylate 8" was obtained.

II.3 Syntheses of Polyalkoxylated Polyalkylenimines

II.3.1 Synthesis of Alkoxylated Polyethylenimine (B.1A)

A 200-l autoclave was charged with 16.5 kg of stage 1-propoxylate 1 and 510 g KOH (48% aqueous solution). The water was removed at 20 mbar (2 h, 130° C.). Then, the autoclave was purged with nitrogen and subsequently heated to 172° C. 132.5 kg of ethylene oxide were added under stirring and allowed to react until pressure control signaled completion (12.6 h). The mixture so obtained was cooled to 120° C., and the volatile ingredients were removed in vacuo. An amount of 149.8 kg of an almost colorless solid was obtained that was alkoxylated polyethylenimine (B.1A).

When the above procedure was essentially repeated but with C-stage 1-propoxylate, C-(B.1A) was obtained.

II.3.2 Synthesis of Alkoxylated Polyethylenimine (B.1B)

A 200-l autoclave was charged with 15.0 kg of stage 1-propoxylate 2 and 510 g KOH (48% aqueous solution). The water was removed at 20 mbar (2 h, 130° C.). Then, the autoclave was purged with nitrogen and subsequently heated to 172° C. 132.5 kg of ethylene oxide were added under stirring and allowed to react until pressure control signaled completion (12.9 h). The mixture so obtained was cooled to 120° C. and the volatile ingredients were removed in vacuo. An amount of 148.0 kg of an almost colorless solid was obtained that was alkoxylated polyethylenimine (B.1B).

II.3.3 Synthesis of Alkoxylated Polyethylenimine (B.1C)

A 200-l autoclave was charged with 12.5 kg of stage 1-propoxylate 3 and 510 g KOH (48% aqueous solution). The water was removed at 20 mbar (2 h, 130° C.). Then, the autoclave was purged with nitrogen and subsequently heated to 172° C. 132.5 kg of ethylene oxide were added under stirring and allowed to react until pressure control signaled completion (13.3 h). The mixture so obtained was cooled to 120° C., and the volatile ingredients were removed in vacuo. An amount of 145 kg of an almost colorless solid was obtained that was alkoxylated polyethylenimine (B.1C).

II.3.4 Synthesis of Alkoxylated Polyethylenimine (B.1D)

A 200-l autoclave was charged with 19.4 kg of stage 1-propoxylate 4 and 510 g KOH (48% aqueous solution). The water was removed at 20 mbar (2 h, 130° C.). Then, the autoclave was purged with nitrogen and subsequently heated to 172° C. 132.5 kg of ethylene oxide were added under stirring and allowed to react until pressure control signaled completion (12.6 h). The mixture so obtained was cooled to 120° C., and the volatile ingredients were removed in vacuo. An amount of 152.5 g of an almost colorless solid was obtained that was alkoxylated polyethylenimine (B.1D).

When the above procedure was essentially repeated but with C-stage 1-propoxylate 5, C-(B.1D) was obtained.

II.3.5 Synthesis of Alkoxylated Polyethylenimine (B.1E)

A 200-l autoclave was charged with 19.4 kg of stage 1-propoxylate 4 and 3.63 kg of a 7% NaOCH$_3$ solution in ethanol/n-nonanol (2:1 by volume) were added. The ethanol was removed at 20 mbar (1 h, 65° C.). Then, the autoclave was purged with nitrogen and subsequently heated to 172° C. An amount of 132.5 kg of ethylene oxide were added under stirring and allowed to react until pressure control signaled completion (11.2 h). The mixture so obtained was cooled to 120° C., and the volatile ingredients were removed in vacuo. An amount of 153 kg of an almost colorless solid was obtained that was alkoxylated polyethylenimine (B.1E).

II.3.6 Comparative Example: Synthesis of Alkoxylated Polyethylenimine C-(B.1F)

A 200-l autoclave was charged with 15.0 kg of stage 1-ethoxylate 1 and 535 g KOH (48% aqueous solution). The water was removed at 20 mbar (2 h, 130° C.). Then, the autoclave was purged with nitrogen and subsequently heated to 172° C. 137.8 kg of ethylene oxide were added under stirring and allowed to react until pressure control signaled completion (16.6 h). The mixture so obtained was cooled to 120° C., and the volatile ingredients were removed in vacuo. An amount of 151.5 kg of a brownish solid was obtained that was alkoxylated polyethylenimine C-(B.1F).

II.3.7 Comparative Example Synthesis of Alkoxylated Polyethylenimine C-(B.1G)

A 200 l autoclave was charged with 15.0 g stage 1-ethoxylate 1 and 3.8 kg of a 7 wt. % solution of NaOCH$_3$ in ethanol/n-nonanol (2:1 by volume) were added. The ethanol was removed at 20 mbar (1 h, 65° C.). Then, the autoclave was purged with nitrogen and subsequently heated to 172°. An amount of 137.8 kg of ethylene oxide were added under stirring and allowed to react until pressure control signaled completion (14.9 h). The mixture so obtained was cooled to 120° C., and the volatile ingredients were removed in vacuo. An amount of 153.0 kg of a brownish solid was obtained that was alkoxylated polyethylenimine C-(B.1G).

II.3.8 Synthesis of Alkoxylated Polypropylenimine (B.2A)

A 2-l autoclave was charged with 23.7 kg of stage 1-propoxylate 5 and 533 g KOH (48% by weight aqueous KOH solution). The water was removed at 20 mbar (2 h, 130° C.). Then, the autoclave was purged with nitrogen and subsequently heated to 172° C. 137.1 kg of ethylene oxide were added under stirring and allowed to react until pressure control signaled completion (11.3 h). The mixture so obtained was cooled to 120° C., and the volatile ingredients were removed in vacuo. An amount of 158.9 kg of a light yellowish solid was obtained that was alkoxylated polypropylenimine (B.2A).

II.3.9 Comparative Example: Synthesis of Alkoxylated Polypropylenimine C-(B.2B)

A 2-l autoclave was charged with 21.4 kg of stage 1-ethoxylate 2 and 533 g KOH (48% by weight aqueous KOH solution). The water was removed at 20 mbar (2 h, 130° C.). Then, the autoclave was purged with nitrogen and subsequently heated to 172° C. 137 kg of ethylene oxide were added under stirring and allowed to react until pressure control signaled completion (15.2 h). The mixture so obtained was cooled to 120° C., and the volatile ingredients were removed in vacuo. An amount of 157.7 kg of a brownish solid was obtained that was alkoxylated polypropylenimine C-(B.26).

II.3.10 Synthesis of Alkoxylated Polyethylenimine (B.3A)

A 2-l autoclave was charged with 14 kg of stage 1-propoxylate 6 and 3.8 kg of a 7 wt. % solution of NaOCH$_3$ in ethanol/n-nonanol (2:1 by volume) were added. The ethanol was removed at 20 mbar (1 h, 65° C.). Then, the autoclave was purged with nitrogen and subsequently heated to 172° C. 137.8 kg of ethylene oxide were added under stirring and allowed to react until pressure control signaled completion (14.4 h). The mixture so obtained was cooled to 120° C., and the volatile ingredients were removed in vacuo. An amount of 152.3 kg of an almost colorless solid was obtained that was alkoxylated polyethylenimine (B.3A).

II.3.11 Comparative Example: Synthesis of Alkoxylated Polyethylenimine C-(B.3B)

A 2-l autoclave was charged with 12.7 kg of stage 1-ethoxylate 3 and 3.8 kg of a 7% solution of NaOCH$_3$ in ethanol/n-nonanol (2:1 by volume) were added. The ethanol was removed at 20 mbar (1 h, 65° C.). Then, the autoclave was purged with nitrogen and subsequently heated to 172° C. An amount of 137.6 kg of ethylene oxide were added under stirring and allowed to react until pressure control signaled completion (17.5 h). The mixture so obtained was cooled to 120° C., and the volatile ingredients were removed in vacuo. An amount of 151.1 kg of a brownish solid was obtained that was alkoxylated polyethylenimine C-(B.3B).

II.3.12 Synthesis of Alkoxylated Polyethylenimine (B.4A)

A 2-l autoclave was charged with 10.6 kg of stage 1-propoxylate 7 and 539 g KOH as 48% by weight aqueous solution). The water was removed at 20 mbar (2 h, 100° C.). Then, the autoclave was purged with nitrogen and subsequently heated to 172° C. 139.1 kg of ethylene oxide were added under stirring and allowed to react until pressure control signaled completion (14.1). The mixture so obtained was cooled to 120° C., and the volatile ingredients were removed in vacuo. An amount of 149.3 kg of a faint yellowish solid was obtained that was alkoxylated polyethylenimine (B.4A).

II.3.13 Comparative Example: Synthesis of Alkoxylated Polyethylenimine C-(B.4B)

A 200-l autoclave was charged with 9.6 kg of stage 1-ethoxylate 4 and 539 g KOH 48% by weight aqueous solution). The water was removed at 20 mbar (2 h, 130° C.). Then, the autoclave was purged with nitrogen and subsequently heated to 172° C. 139.1 kg of ethylene oxide were added under stirring and allowed to react until pressure control signaled completion (18.1 h). The mixture so obtained was cooled to 120° C., and the volatile ingredients were removed in vacuo. An amount of 148 kg of a brownish solid was obtained that was alkoxylated polyethylenimine (C-(B.4B).

II.3.14 Synthesis of Alkoxylated Polyethylenimine (B.5A)

A 200-l autoclave was charged with 29.2 kg of stage 1-propoxylate 8 and 2.9 kg of a 7 wt. % NaOCH$_3$ solution in ethanol/n-nonanol (2:1 by volume) were added. The ethanol was removed at 20 mbar (1 h, 65° C.). Then, the autoclave was purged with nitrogen and subsequently heated to 172° C. An amount of 105.9 kg of ethylene oxide were added under stirring and allowed to react until pressure control signaled completion (11.7 h). The mixture so obtained was cooled to 120° C., and the volatile ingredients were removed in vacuo. An amount of 135 kg of a light yellowish solid was obtained that was alkoxylated polyethylenimine (C5).

II.3.15 Comparative Example: Synthesis of Alkoxylated Polyethylenimine C-(B.5B)

A 200-l autoclave was charged with 26.4 kg of stage 1-ethoxylate 5 and 2.9 kg of a 7% by weight NaOCH$_3$ solution in ethanol/n-nonanol (2:1 by volume) were added. The ethanol was removed at 20 mbar (1 h, 65° C.). Then, the autoclave was purged with nitrogen and subsequently heated to 172° C. An amount of 105.9 kg of ethylene oxide were added under stirring and allowed to react until pressure control signaled completion (14.2 h). The mixture so obtained was cooled to 120° C., and the volatile ingredients were removed in vacuo. An amount of 131.9 kg of a brownish solid was obtained that was alkoxylated polyethylenimine C-(B.5B).

TABLE 2

Properties of inventive alkoxylated polyalkylenimines and of comparison materials

| | PEG-content [wt. %] | Iodine Color number | Hazen Color number |
|---|---|---|---|
| (B.1A) | 0.9 | 1.4 | 245 |
| (B.1B) | 1.1 | 1.3 | 230 |
| C-(B.1A) | 2.7 | 2.6 | 440 |
| (B.1C) | 1.3 | 1.5 | 260 |
| (B.1D) | 1.5 | 1.3 | 225 |
| C-(B.1D) | 2.7 | 2.3 | 370 |
| (B.1E) | 1.0 | 1.4 | 250 |
| C-(B.1F) | 3.3 | 3.1 | 530 |
| C-(B.1G) | 3.0 | 2.9 | 485 |
| (B.2A) | 1.8 | 1.8 | 310 |
| C-(B.2B) | 3.5 | 4.4 | 760 |
| (B.3A) | 1.4 | 0.8 | 160 |
| C-(B.3B) | 4.3 | 2.5 | 420 |
| (B.4A) | 0.7 | 0.4 | 90 |
| C-(B.4B) | 2.9 | 2.1 | 350 |

TABLE 2-continued

Properties of inventive alkoxylated polyalkylenimines and of comparison materials

| | PEG-content [wt. %] | Iodine Color number | Hazen Color number |
|---|---|---|---|
| (B.5A) | 0.5 | 1.8 | 300 |
| C-(B.5B) | 2.2 | 4.0 | 670 |

Polypropylene glycol: below detection level

The invention claimed is:

1. A process for manufacturing an alkoxylated polyalkylenimine, said process comprising the following steps:
   (a) providing a polyalkylenimine (A),
   (b) reacting said polyalkylenimine (A) with 0.5 to 1.3 moles of propylene oxide or butylene oxide per N—H function at a temperature in the range of 100 to 150° C., wherein step (b) is performed in the presence of 5 to 25% by weight of water, referring to the polyalkylenimine (A),
   (c) reacting the product from step (b) with ethylene oxide; wherein the alkoxylated polyalkylenimine obtained contains 3 to 50 ethylene oxide units per N—H function of a backbone polyalkylenimine and in the range of 0.1 to 2.5% by weight of polyethylene glycol; and wherein the alkoxylated polyalkylenimine has a Hazen color number in the range of 10 to 350.

2. The process according to claim 1 wherein step (c) is performed in an organic solvent.

3. The process according to claim 1 wherein step (c) is performed with a catalyst selected from C$_1$-C$_{10}$-alkanolates of sodium and potassium.

4. The process according to claim 1 wherein the polyalkylenimine (A) is selected from polyethylenimines and polypropylenimines.

5. The process according to claim 2 wherein the organic solvent is selected from C$_1$-C$_{10}$-alkanols.

6. The process according to claim 1 wherein step (c) is performed at a temperature in the range of 70 to 200° C.

7. The process according to claim 1 wherein step (b) is performed without a catalyst.

8. An alkoxylated polyalkylenimine containing 0.5 to 1.3 moles of propylene oxide or butylene oxide per N—H function of a backbone polyalkylenimine and 3 to 50 ethylene oxide units per N—H function of the backbone polyalkylenimine and containing in the range of 0.1 to 2.5% by weight of polyethylene glycol, wherein the alkoxylated polyalkylenimine has a Hazen color number in the range of 10 to 350.

9. The alkoxylated polyalkylenimine according to claim 8 wherein the alkoxylated polyalkylenimine has a Hazen color number in the range of 90 to 310.

10. The alkoxylated polyalkylenimine according to claim 8 wherein the polyalkylenimine is selected from polyethylenimines and polypropylenimines.

11. The alkoxylated polyalkylenimine according to claim 8 containing in the range of 0.5 to 1.8% by weight of polyethylene glycol.

* * * * *